Feb. 11, 1941.    R. H. TAYLOR    2,231,304
CHANGE MAKING MACHINE
Filed June 25, 1938    6 Sheets-Sheet 1

Inventor
Robert H. Taylor
By Clayton L. Jenks
Attorney

Feb. 11, 1941.   R. H. TAYLOR   2,231,304
CHANGE MAKING MACHINE
Filed June 25, 1938   6 Sheets-Sheet 2

Inventor
Robert H. Taylor
By Clayton R. Jenks
Attorney

Witness
Wm. D. McKeon

Patented Feb. 11, 1941

2,231,304

UNITED STATES PATENT OFFICE 2,231,304

CHANGE MAKING MACHINE

Robert H. Taylor, Leicester, Mass.

Application June 25, 1938, Serial No. 215,768

11 Claims. (Cl. 133—2)

This invention relates to a money changing device and more particularly to a device which tenders in coins the difference between the amount of money received and the amount of money due.

There is a need for a manually controlled, automatic mechanism which may be used in a store, for example, for making change and tendering coins representing the difference between the amount of a given purchase and the money received from the purchaser, and which will be unfailingly accurate in its operation and yet may be readily used without necessity of mental calculations or extreme care on the part of the operator except that of pushing the correct register keys corresponding to the money actually received and then pushing keys corresponding to the amount of the transaction.

The primary object of this invention is to satisfy such requirements and to provide a device of this type which is simple in its construction and may be easily and economically manufactured.

A further object is to provide a coin changing apparatus which has only a small number of manually operable keys for registering all receipt and purchase amounts of one dollar or less and which therefore may be very easily operated without serious danger of mistakes.

A still further object is to provide a device of this type wherein certain purchase key mechanism has additive functions and other purchase key mechanism has subtraction functions which cooperate with receipt key mechanism in such a way as to make it possible to employ only 5 receipt keys and 18 purchase keys for making change for all receipt and purchase amounts of one dollar or less. Further objects will be apparent in the following disclosure.

Referring to the drawings which illustrate a preferred embodiment of my invention.

In accordance with my invention, I have provided a money changing apparatus which comprises receptacles for the various coins and ejectors arranged to remove coins therefrom as required. The coin ejectors are brought into operative association with the coin receptacles by means of mechanism including manually operated keys which momentarily register the amounts of money received. In the preferred arrangement, one set of keys serves to set up the ejectors, and a second set of keys is arranged to remove certain of the coin ejectors from such set up position and thus serve to subtract from the total amount represented by the first set of keys that amount which is registered by the second set. The operating mechanism preferably comprises pairs of levers, or rockers, one of each pair being moved by the receipt keys and the other by the purchase keys and these rockers are so arranged that weights are moved thereby into and out of operative association with the coin ejectors so as to set up the right ejectors for ejecting coins. These weight and rocker mechanisms are so inter-related that only a very small number of parts are required for the purpose, and this is accomplished by having certain purchase keys subtract amounts from the receipt key set ups, while others complete the set up of the receipt keys or serve to add coins to those capable of being ejected as change due.

Figure 1:
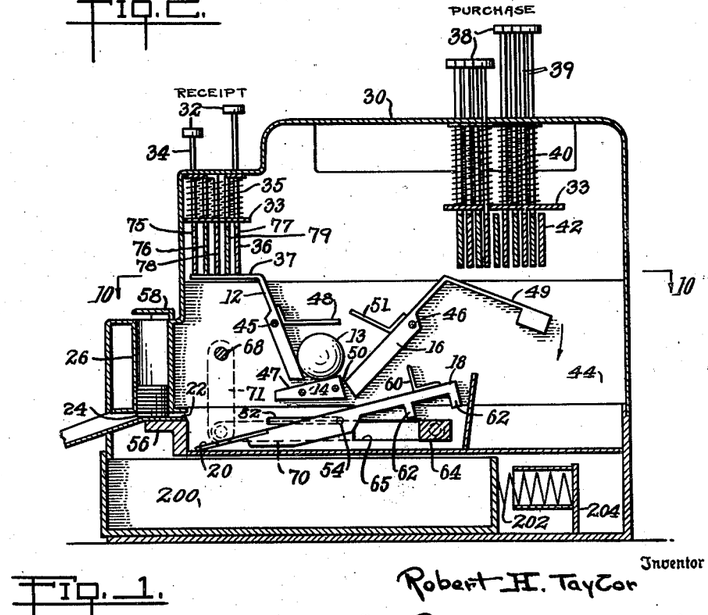
Fig. 1 is a vertical section on the line 1—1 of Fig. 3 showing a money receptacle, the pusher keys and the chief type of key operated, subtracting and money delivering elements.
Figure 2:
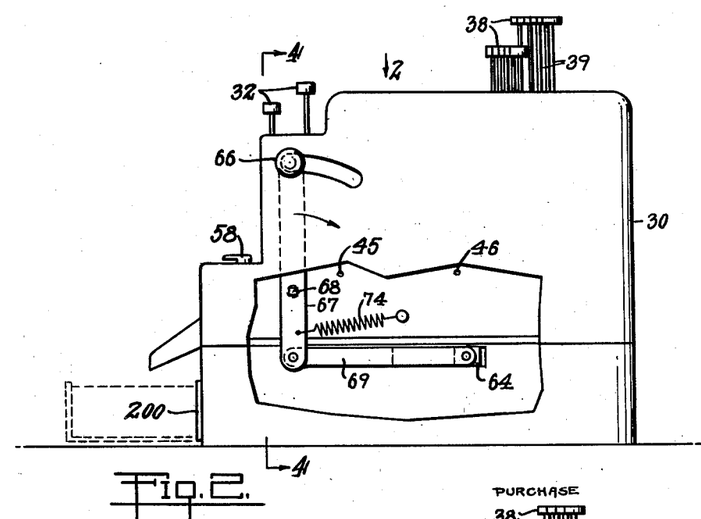
Fig. 2 is a side elevation of the casing with parts broken away.
Figure 3:
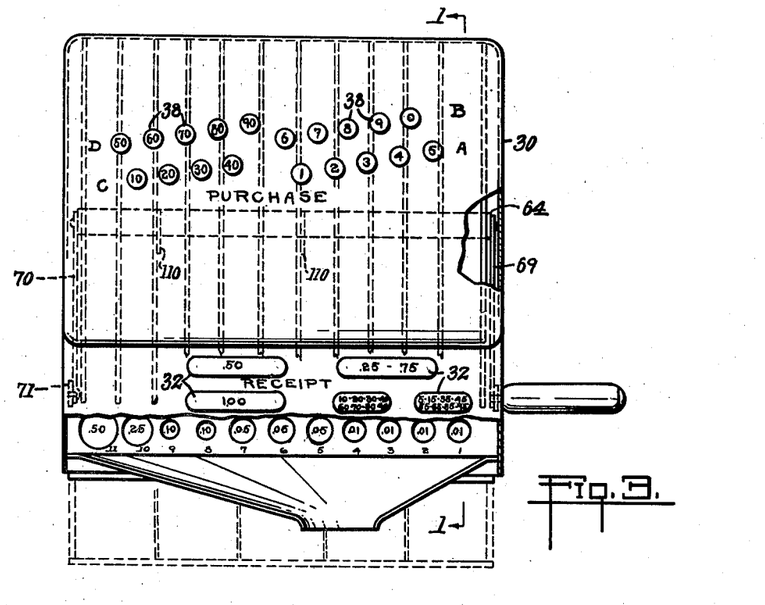
Fig. 3 is a top plan view of the device, partly broken away.
Figure 4:
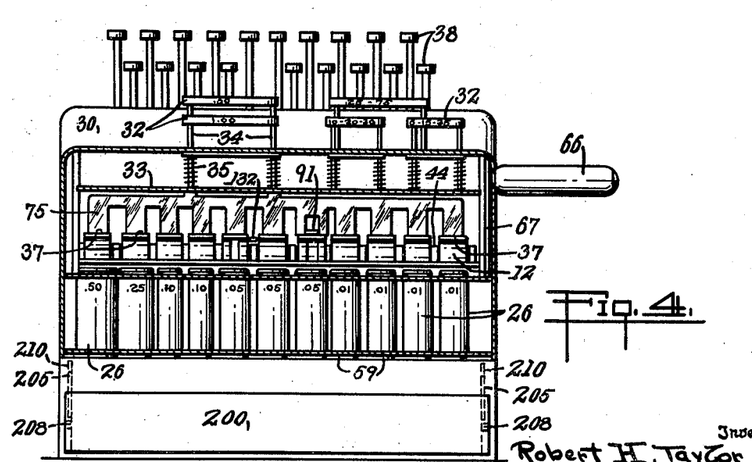
Fig. 4 is a vertical section on the line 4—4 of Fig. 2 looking in the direction of the arrows.

Referring more particularly to the drawings, I have shown in Fig. 1 the construction of the chief operating elements, which are used at the stations which control the coin receptacles 1, 2, 3, 4, 6, 7, 8, 10 and 11 as numbered from the right in Figs. 3 and 4. There are two banks of keys respectively labeled "Receipt" and "Purchase." The receipt keys are arranged to operate various rockers 12 so as to thrust a movable weight, such as a metal ball 13 or other shaped body, from a stationary shelf 14 into contact with an overweighted rocker 16 so that the latter under the weight of the ball 13 will tip a pivoted ejector slide 18 into such a position that its nose portion 20 may be subsequently moved across the shelf 22 and eject the bottom coin 24 from the coin receptacle 26 holding the same. This operation may be reversed, so as to tip the ejectors from operative to inoperative positions, and the other parts of the mechanism suitably arranged therefor. The purchase keys are so constructed and arranged that they in turn are able to move the rockers 16 in a reverse direction and thrust the weights 13 back onto the shelves 14 and thus allow the weighted ejector slides 18 to tip into inoperative positions, as shown in Fig. 1, and so be unable to eject coins from the receptacles. The parts are so arranged that if the receipt is 10 cents and the purchase 7 cents, for example, the receipt key for 10 cents sets up ejectors for ejecting a nickel and 4 pennies, and the purchase keys will remove from operation the ejectors for the nickel and one penny and so permit only 3 cents to be ejected. Various other constructional features are however required with the elements thus briefly described, in order that the mechanism may be simple in design and not require a separate key for each numeral from 1 to 100 as might be needed for making all of the various combinations of change. As shown in Fig. 3, it is merely necessary to have 5 keys for the money received and 18 or 19 keys for the amount to be registered for the purchase. Hence the device may be very readily operated by anyone with little likelihood of mistakes being made.

Referring now to Figs. 1 to 4 inclusive it will be seen that the construction comprises a suitable housing 30 within which the mechanism is located and preferably made of metal top, bottom and side walls. Two banks of receipt keys 32 are mounted for vertical movement at the top and front of the casing. For this purpose, a cross wall 33 (Fig. 1) is provided. Each of the keys comprises two vertical push rods 34 connected at their tops by a finger button. These rods slide through the top wall of the casing and the cross wall 33, and they are held in their uppermost positions by springs 35 mounted on wall 33 and pushing against collars fixed on the rods. The bottom end of each pair of key rods has secured thereto a peculiar key element 36 of the types shown in Fig. 9. There are only five of these keys and it will be observed from the lettering in Figs. 3 and 9 that there is one key for indicating the receipt of $1.00 and another for 50 cents. A third key is for the receipt of 25 or 75 cents, a fourth key is for the receipt of 10, 20, 30, 40, 60, 70, 80 or 90 cents and the fifth key is for indicating the receipt of 5, 15, 35, 45, 55, 65, 85 or 95 cents.

Figure 8:
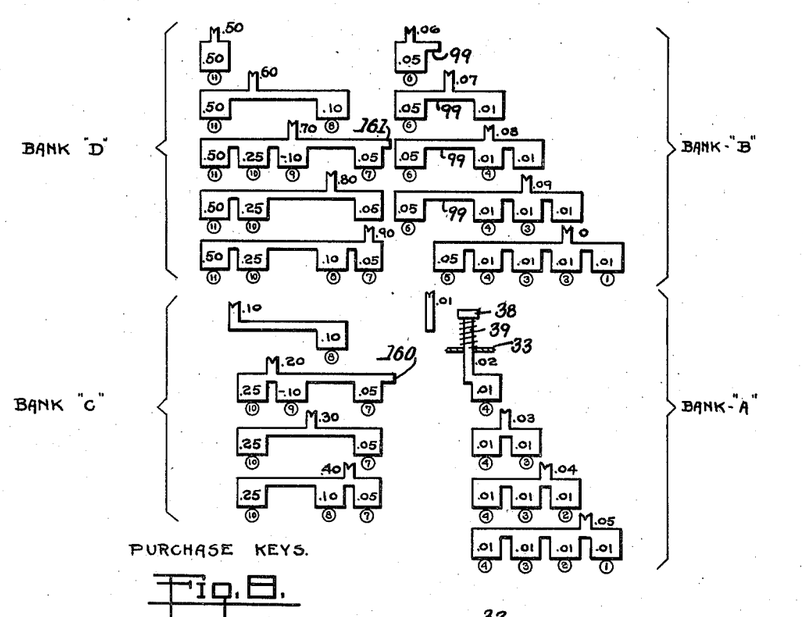
Fig. 8 is a somewhat diagrammatic vertical elevation, partly broken away, of the operating keys which register the amount of the purchase.

The purchase keys 38 are also mounted in two banks at the rear and top of the machine. Each of these also comprises a push button at the top mounted on a single vertical rod 39 which slidably passes through the top wall of the casing 30 and the inner wall 33 and is held in an uppermost position by a spring 40. The key elements 42 secured at the bottom of these keys are shown in Fig. 8 of the drawings. There are 10 keys in the rear bank and 8 operative keys in the front bank with a key representing a one cent purchase that has no function but is used to avoid confusing the operator of the machine.

Low vertical walls 44 (Figs. 1 and 10) are mounted in spaced relationship near the bottom of the casing so as to form eleven pockets opposite the money receptacles 26. The rockers 12 and 16 are mounted on horizontal rods 45 and 46 passing through these pocket walls, a pair of rockers being located in each of the pockets. The rocker 12 is a bell crank lever shaped as shown in Fig. 1, the upper end 37 thereof being substantially horizontal in its normal position and of such length and location that it extends beneath all of the receipt key elements 36. The lower end of the receipt rocker 12 is sufficiently heavy so that the rocker tends to stay in the position of Fig. 1. The shelf 14 adapted to support the ball weight 13 is suitably secured to the partitions 44 and so mounted within each of the pockets that its upper surface 47 inclines towards the front and holds the weight 13 thereon in contact with the lower end of the receipt rocker 12. A flange 48 on the rocker 12 helps to prevent the weighted ball from being thrown out of position during the operation of the machine.

The purchase rocker 16 is similarly shaped as a bell crank lever with its upper end 49 adapted to be presented in a horizontal position in contact with the under sides of the purchase key elements 42. The lower end of this rocker 16 is of light weight and the arm 49 is weighted so that the rocker tends to stay in the position shown in Fig. 1, with its lower part close to the rearwardly sloping face 50 of the shelf 14. These parts are so constructed and arranged that movement of the receipt rocker 12 by its corresponding receipt key thrusts the ball 13 against the rocker arm 16 and moves the lower end downwards and the upper end 49 into contact with the purchase keys, with the ball resting in the pocket between the rear face 50 of the shelf 14 and the rocker lever 16, as shown for example in Fig. 5. A flange 51 secured on the upper face of the rocker 16 also aids in preventing the ball 13 from getting out of place.

Figure 7:
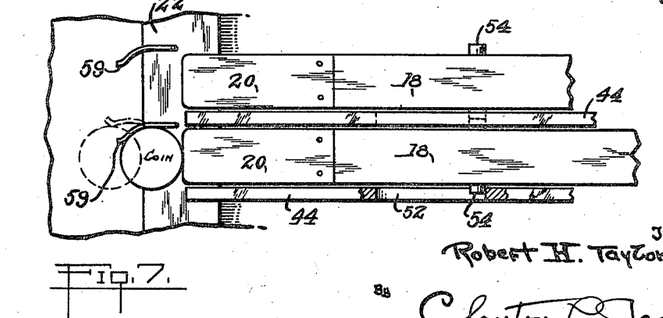
Fig. 7 is a detail showing a plan view of the money pushers taken on the line 7—7 of Fig. 6.

A series of horizontal parallel slots 52 (Figs. 1 and 7) are formed in the vertical walls 44 substantially beneath the shelves 14. An ejector 18 is located in each compartment, and it is mounted on short pins 54 projecting laterally from each side which fit into and slide within the slots 52 so that the ejector 18 may be moved back and forth as required. The ejector 18 comprises a casting having a thin lip secured on its front end forming the nose 20 which is of a thickness and width no greater than the dimensions of the coin to be ejected and arranged to enter a slot between the bottom and the side wall of the coin receptacle and eject a coin therefrom. The pivoted ejector 18 is adapted to be rocked from the position of Fig. 1 to that of Fig. 5, so that its thin nose portion 20 may be moved subsequently over the shelf 22 mounted on a flanged portion 56 of the framework of the machine. There it contacts with one of the coins 24 in the coin receptacle 26.

The coin receptacles may each be made as a hollow cylindrical body of the shape and size adapted to carry a plurality of coins 24 therein. They are suitably mounted in spaced relationship above the top of the shelf 22, so that the coin pusher 20 may pass between the bottom end of the receptacle and the shelf. There is a receptacle for each one of the pockets and ejectors therein; and the first four of these receptacles, from the right of Fig. 3, are to hold pennies. The next three are for nickels. The next two are for dimes and the last two are for 25 and 50 cent pieces respectively. Each of these coin receptacles has an upper lip 58 which is so shaped and arranged that coins may be inserted into the compartment but not removed therefrom. At the lower end a spring 59 (Fig. 7) is so mounted as to hold a coin normally in position in the receptacle but to be bent outwardly by pressure of the ejector to release a coin. When the ejector nose 20 is removed from beneath the coin compartment another coin will fall into place ready for ejection.

The pivoted ejector slide 18 is sufficiently weighted at its front end so that it will normally stay in the position shown in Fig. 1, with the ejector nose 20 resting on the bottom of the casing. The slide has a flange 60 projecting upwardly on its rear end in such a position that it is adapted to strike the bottom portion of the purchase rocker 16. Two parallel spaced lugs 62 extend from the bottom of the rear end of each of the pivoted ejector slides 18, and a cross bar 64 extending horizontally through elongated slots 65 in the walls 44 are so arranged that when the pivoted slide 18 is rocked into the position of Fig. 5 the lugs 62 on the lever 18 will straddle the top of the cross bar 64 and thus be in position for moving the slide 18. This movement is effected by means of a handle 66 on a lever arm 67 (Figs. 2 and 3) fixed on one end of a shaft 68 passing through the machine which is suitably pivoted at its two ends in the vertical walls of the casing, the ends of shaft 68 being squared. This arm 67 is a lever of the first class and the lower end thereof is connected by a link 69 with the cross bar 64. The opposite end of the cross bar 64 is connected by a link 70 with a rock arm 71 fixed on the squared end of the shaft 68 so as to equalize the motion on the two ends of the pusher bar 64.

Figure 5:
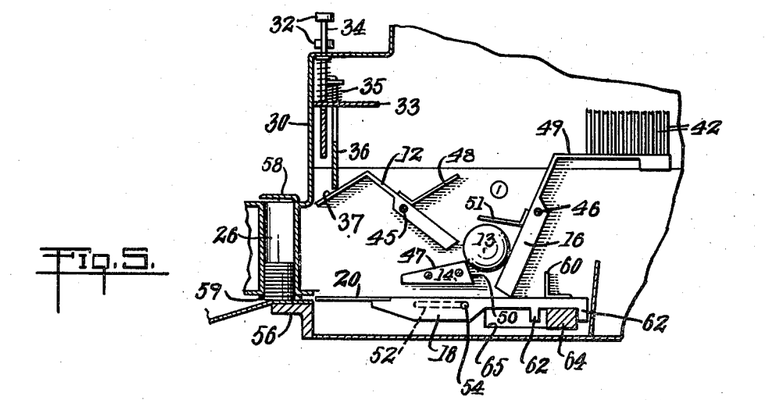
Figs. 5 and 6 are details in vertical section corresponding with Fig. 1, which show the sequence of operation of the main elements from the inoperative position of Fig. 1 to the money pushing position of Fig. 6.

It will now be appreciated by reference to Figs. 1, 4 and 5 that when one of the receipt keys 32 is manually depressed against the influence of the spring 35, the key element thereon strikes the end 37 of the rocker 12 and the ball 13 is thrust from the shelf 14 into contact with the rocker 16. The lower end of the purchase rocker is thus caused to strike against the uptilted rear end of the ejector slide 18, and it tilts that slide down into contact with the pusher bar 64. If then the handle 66 is operated in the direction of the arrow (Fig. 2) this will force the pusher bar 64 forwardly and cause the ejector slide to travel therewith and to eject a coin from the compartment 26. In so far as described the machine may be used for the simple operation of delivering a required number of coins.

To effect the subtracting operation required for making change, I have arranged the purchase keys and their operating elements so that certain ejector slides 18 are removed from operative association with the coin receptacles, and thus the amounts of the coins represented by these particular slides are subtracted from the total represented by all of the slides that were initially placed in operative position for ejecting coins. That is, the operation of pushing down certain purchase keys causes the front end of the lever 16 to be raised and to throw the balls 13 back onto the shelf 14. Then since the weighted lever 16 tends to stay out of contact with the slide 18 under these conditions, the slide will again fall to its inoperative position shown in Fig. 1. Then by operating the handle 66, only those slides 18 will be thrust forward which have been set up in the positions of Fig. 5.

Figure 6:
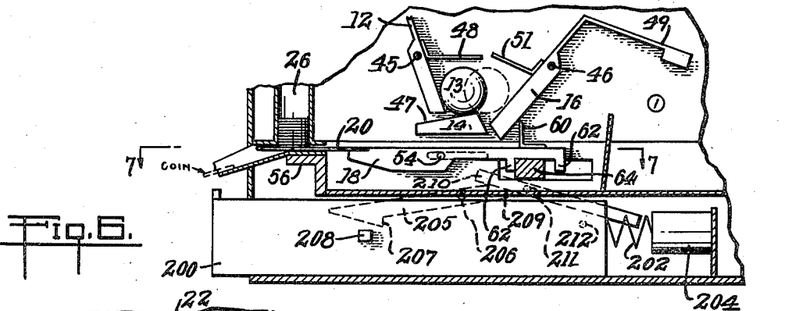

It will be noted by reference to Fig. 6 that the forward motion of the slide 18 (to the left) causes the upstanding flange 60 to strike the under rear face of the purchase rocker 16 and to lift the same and thrust the ball 13 back onto its shelf, thus resetting the mechanism for another use. The return motion of the handle 66 which may be effected by a spring 74 (Fig. 2), returns the ejector slides 18 to their inoperative positions of Fig. 1, since the balls are no longer holding them in the horizontal ejecting positions.

Figure 9:
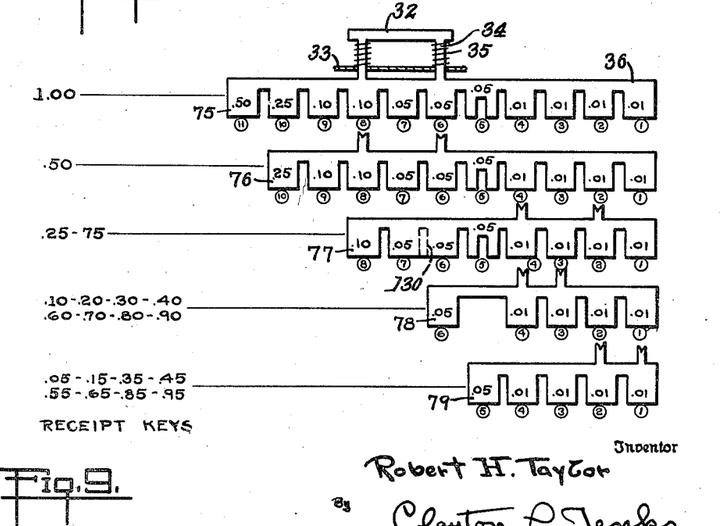
Fig. 9 is a similar view of the keys registering the amount received.

A primary feature of this invention involves so constructing and arranging the different purchase and receipt keys and their associated rocker elements that only a very small number of these parts are required. To this end, I have so constructed and located the key elements or fingers on the bottoms of the receipt and purchase keys that 5 receipt and 18 purchase elements will make all of the possible change combinations. The shapes and locations of these key elements are shown in Figs. 8 and 9. For example, the dollar receipt key 32 has a set of depending fingers 75 which engage each one of the front horizontal ends 37 of the receipt rockers 12, as shown in Fig. 4. Hence, when one depresses the dollar receipt key all of the ejector slides 18, except the ones in stations 5 and 9 to be described later, are thrust into position for ejecting coins from the rest of the receptacles, totaling 99 cents, or one cent less than the receipt amount, since the purchase must be at least one cent. The 50 cent key (Fig. 9) has its key fingers 76 located directly in the rear of the dollar key fingers, and these are adapted to move the rockers in all of the compartments except the 50 cent one, and the rockers in stations 5 and 9, since obviously there will never be as much as 50 cents change from a purchase where the total receipt is only 50 cents. The 25—75 cent key has its fingers 77 located in the rear of the 50, and the fingers 78 of the elements representing the 10 cent variations are in the rear of element 77, and the fingers 79 representing the 5 cent variations are in the rearmost position thereon, as shown in Fig. 1. Fig. 9 shows the respective locations of the fingers in their various pockets, the pocket or station numbers being represented by numerals in small circles beneath the fingers. The coin values are marked on the fingers to simplify the explanation given herein, and the receipt values of the keys are shown at the left.

Fig. 8 shows similarly the shapes and locations of the fingers of and the amounts represented by the purchase keys. These are arranged in four banks A, B, C and D, the keys of banks A and C being in front of the others (Figs. 3 and 8). The pocket or stations of these keys are indicated by the numbers in circles beneath the banks. Banks C and D represent the purchases in multiples of 10 cents, and the other two banks the values in digits. The total value of the key is shown opposite the key stem at the top of each key. The one cent key in bank A is not needed and is inoperative, since the other purchase elements are so arranged that the change will always be at least 1 cent less than the amount received.

The construction so far described is the same for each of the stations 1, 2, 3, 4, 6, 7, 8, 10 and 11, the construction in stations 5 and 9 being a special type to be described later. As a simple example illustrating the operation of the mechanism involved in those similar stations, assume that the apparatus is used in a store to give back the change from a 10 cent piece tendered in payment for a 7 cent purchase. Reference to Fig. 9 shows that the 10 cent receipt key operates the elements in stations 1, 2, 3, 4 and 6. Hence, when the 10 cent key is depressed, the fingers 78 move the weights 13 and lift the coin ejectors 18 into operative positions for each of the penny compartments and for the middle 5 cent compartment. The store clerk then depresses the purchase key for 7 cents which is to be found in bank B of Fig. 8. This causes the fingers to operate in compartments 4 and 6 and to throw the ejectors 18 there into inoperative positions. This subtracts a 5 cent piece in station 6 and a one cent piece in station 4 from the amount that was set up by the receipt key operation. This leaves the first three ejectors ready to eject pennies in the first three compartments when the handle 66 is operated. The set up for these stations and fingers may be tabulated as follows:

| Station | 6 | 5 | 4 | 3 | 2 | 1 |
|---|---|---|---|---|---|---|
| Receipt coins | 5 | - | 1 | 1 | 1 | 1 |
| Purchase coins | 5 | - | 1 | - | - | - |
| Subtraction | - | - | - | 1 | 1 | 1 |

Change 3 cents.

Another simple example involves a receipt of 40 cents and a purchase of 32 cents. The set up is as follows:

| Station | 10 | 9 | 8 | 7 | 6 | 5 | 4 | 3 | 2 | 1 |
|---|---|---|---|---|---|---|---|---|---|---|
| Receipt coins | - | - | - | - | 5 | - | 1 | 1 | 1 | 1 |
| Purchase 30 cents | 25 | - | - | 5 | - | - | - | - | - | - |
| Purchase 2 cents | - | - | - | - | - | - | 1 | - | - | - |
| Subtraction | - | - | - | - | 5 | - | - | 1 | 1 | 1 |

It is to be noted that the 40 cent key is used for all 10 cent variations except 50 cents and $1.00. The purchase key for 30 cents found in bank C of Fig. 8 throws up fingers 18 in station 7 for a nickel and in station 10 for 25 cents. Neither of these fingers can do anything, since no ejector slide 18 has been raised in those stations by a receipt key and the weight 13 is still resting on the stationary block 14. Hence the operation of these keys is idle. However, the depression of the key for 2 cents causes a single finger in the fourth penny compartment to be moved, and this renders inoperative the slide 18 for one penny and leaves slides set up for one nickel and three pennies, thus giving the correct change of 8 cents.

Figure 10:
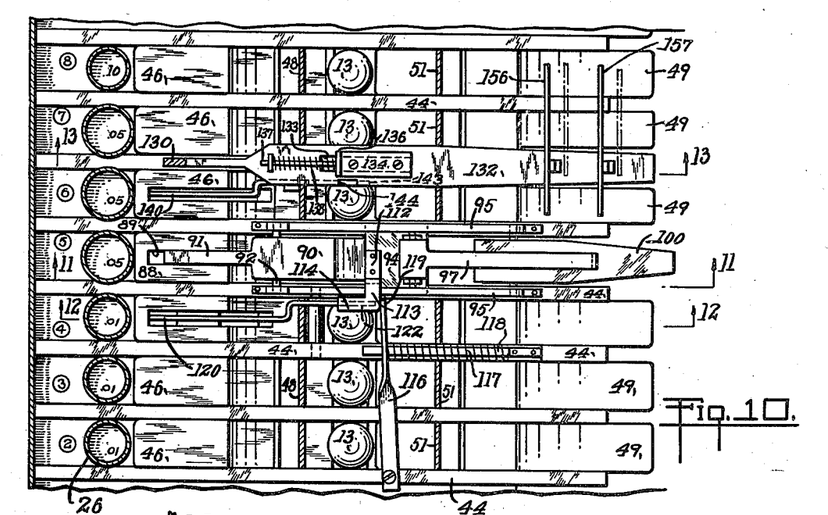
Fig. 10 is a top plan view, partly broken away, taken on the line 10—10 of Fig. 1 which shows the ejector setting mechanism in various numbered pockets or stations.
Figures 11, 12:
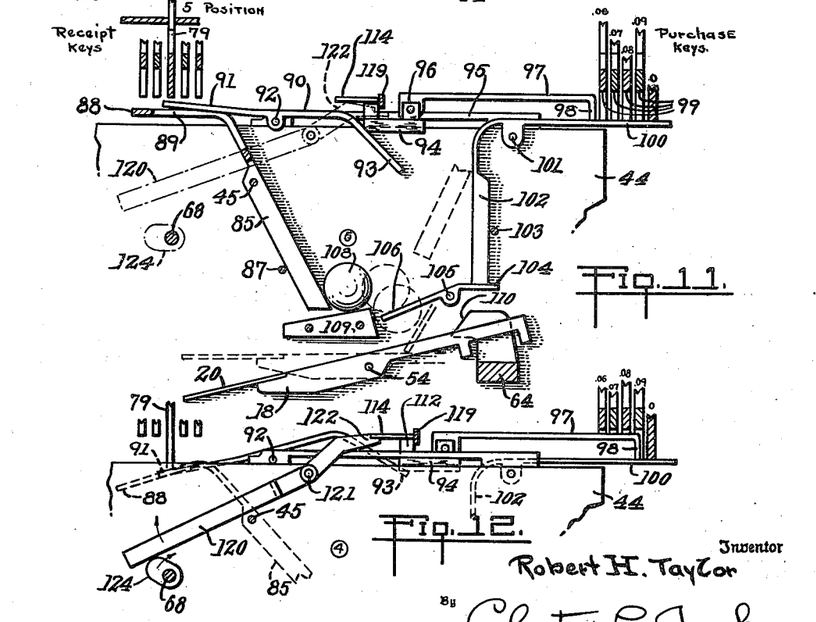
Fig. 11 is a fragmentary elevation, partly in section, taken on the line 11—11 of Fig. 10 showing the mechanism in pocket No. 5.
Fig. 12 is a fragmentary view, taken on the line 12—12 of Fig. 10, showing the latch mechanism located in the pocket No. 4, which cooperates with the operating mechanism located in the pocket No. 5 of Fig. 11.

The simplification of the apparatus requires an altogether different construction in compartment No. 5. This is shown primarily in Figs. 10, 11 and 12. The receipt rocker 85 (corresponding with rocker 12 in Fig. 1) is hinged on rod 45 and is limited in its downward left hand motion by a stop 87. It has its upper horizontal arm 88, which extends beneath the receipt keys, cut out in its central portion to form a slot 89. A lever 90 is mounted to have its narrow end 91 freely movable within that slot and with its upper surface projecting slightly above the top face of the slotted arm 88. This lever 90 is pivoted on a pin 92 passing through ears thereon and suitably mounted on the adjacent partition walls 44. The right hand end of this lever 90 is bent downwardly, as shown in Fig. 11, to provide a cam 93 which passes in front of and beneath a sliding block 94 suitably mounted for sliding towards and from the front of the machine. This block may slidably rest on the tops of the walls 44 and may be guided and held in position by straps 95 secured on the tops of the walls and located above the slide block. This slide block has upstanding ears 96 between which is pivotally mounted a lever arm 97 which has a down turned flanged portion 98 at its rear end.

The purchase keys for the amounts of 6, 7, 8 and 9 cents are shaped as shown in bank B of Fig. 8 to provide cut out spaces and under surfaces 99 opposite station No. 5. The lever 97 on slide 94 is so shaped and arranged that it may be moved into these openings of station No. 5, beneath the key surfaces 99 when the cam 93 is is raised by depression of the receipt key 79 (Fig. 12) for the 5, 15, 35, etc., receipts. The other receipt keys are cut away at station 5 so that their fingers do not strike the narrow raised end 91 of the special lever 90. The key elements 75, 76 and 77 have only narrow cuts therein, so that these do not strike the narrow lever end 91 but do contact with the lever end 88 of the rocker 85. When the sliding lever 97 is moved to the right by depression of the key element 79 for one of the 5 cent receipts, the top of this lever 97 passes beneath the under surface 99 of the 6, 7, 8 or 9 cent purchase elements, and it is pushed downwards thereby by any one of these purchase fingers. The lever 97 rests on and thus moves downwardly the lever arm 100 pivoted at 101. The left hand end 102 of this lever arm depends substantially vertically, and its counterclockwise movement is limited by the stationary pin 103 fixed in the frame. The lower end of this lever 102 normally rests above and substantially in contact with the horizontal right hand end of a rocker 104 pivoted at 105 which has its lower end 106 in position to receive the weight 108 that rests on the stationary block 109.

It will, therefore, be seen that the members 85 and 104—106 correspond with the rockers 12 and 16 of the apparatus shown in Fig. 1. The slide ejector 18 in this construction of Fig. 11 is the same as that found in Fig. 1. The cross bar 64 has an upstanding member providing a cam nose 110 which is adapted to strike the under side of the rocker arm 106 and thrust the weight 108 back onto the shelf 109.

The slide block 94 has an upstanding lug 112 (Fig. 12) on its forward top portion which has a laterally projecting arm 113 (Fig. 10) provided with a nose piece or locking member 114 which is adapted to be engaged by a latch mechanism having a locking finger 122, as explained below. This holds the block in the position of Fig. 12 and prevents it from sliding to the left after the key 79 has been depressed and released. A lever 116 (Fig. 10) pivoted to a wall 44 is held in a forward position by a spring 117 surrounding a pin 118 secured to the top of one of the walls 44 between stations 3 and 4, this pin passing through a slot in the lever 116 and thus serving as a guide therefor. The outer end 119 of this lever engages the rear of the arm 113 and thus tends to hold the slide in a forward position except when it is moved by the cam 93. A lever 120 of the first class (Fig. 12) is pivoted at 121 on the walls 44 and the upper end of this lever is notched as shown to provide an under cut latch 122 adapted to lock against the end of the nose piece 114. The left hand end of this lever 120 is of sufficient weight so that it tends to stay in that locked position when permitted by a cam 124. This cam is mounted on the cross rod 68 which carries the handle operating mechanism. That is, after the cam 93 has pushed the sliding lever 97 beneath the purchase key elements, the locking finger 122 on lever 120, which has been previously located beneath the locking member 114, is permitted by its own weight to fall into the locking position of Fig. 12 when the locking member 114 has moved far enough to the right. The slide 94 remains in that locked position until operation of the handle 66 causes the cam 124 to raise the lever 120 and release the slide block 94 and permit the spring 117 to return the parts to the left and out of operative association with the purchase keys, as in Fig. 11.

To explain the operation of the station 5 parts illustrated in Figs. 11 and 12, assume a receipt of 5 cents and a purchase of 3 cents. We then have the following set up:

| Station | 5 | 4 | 3 | 2 | 1 |
|---|---|---|---|---|---|
| Receipt key (.05) | – | 1 | 1 | 1 | 1 |
| Purchase key (.03) | – | 1 | 1 | – | – |
| Subtraction | – | – | – | 1 | 1 |

If one used the key mechanism of Figs. 1, 4 and 5 this would give back 7 cents of change for the 5 cent purchase, since the receipt key in station 5 would be set up. But, the special mechanism of Figs. 11 and 12 makes it impossible to set up slide 18 in station 5, since the ball 108, which is moved to an intermediate position (Fig. 11) on the rocker arm 106, cannot move the rocker 104—106 unless the purchase key unlocks it, and this is not done in this particular example. That is, the 5 cent element at station No. 5 is inoperative although the receipt element 79 did its part to provide the set up. The lever arm 102 has not been moved out of a locking position, since the 3 cent purchase key has no finger or other part which can strike and push down on lever 97 and unlock the purchase rocker. Station No. 5 is set up for ejecting a coin only by the elements of bank B. In the present example, the purchase elements are in bank A, and the lever 102 will remain in the locking position of Fig. 12 and prevent the rocker 106 from moving to set up ejector slide 18 in station 5. These parts are however unlocked by completion of movement of handle 66, whereby cam 124 releases the latch 114—122 and allows the spring 117 to return the slide 94 to its normal left hand position.

If the amount of receipt is 45 cents and the purchase is 38 cents we have the following set up:

| Station | 10 | 9 | 8 | 7 | 6 | 5 | 4 | 3 | 2 | 1 |
|---|---|---|---|---|---|---|---|---|---|---|
| Receipt keys (.45) | – | – | – | – | – | – | 1 | 1 | 1 | 1 |
| Purchase keys (.30) | – | – | – | – | – | – | – | – | – | – |
| Purchase keys (.08) | – | – | – | – | 5 | 5 | 1 | 1 | – | – |
| Subtraction and addition | – | – | – | – | 5 | – | – | 1 | 1 | 10 |

In this case, the five cent receipt key moves the weight 108 halfway to partially set up the 5th station. Also, it moves the arm 97 to the right and into the cut out portion (Fig. 8 bank B) of the 8 cent purchase key where it engages the operating surface 99 in the fifth station. Hence a depression of this purchase key moves the lever 97 downwards and forces the arm 102 out of locking engagement with the rocker arm 106 and thus permits the ball 108 to complete its movement and tip and hold the ejector slide 18 in a horizontal coin ejector position against the pressure of the slightly overbalanced arm 102. Thus the 8 cent purchase key has actually added the 5 cents in station 5 rather than serving to subtract it from the receipt set up. It is in this additive function that the station 5 purchase key mechanism differs from the rest. The 30 cent purchase key has no effect in this example, since the receipt key did not previously set up any ejectors in the 7th and 10th stations. At the same time that the bar 64 and ejector arm 18 move forward to eject the nickel, the cam face 110 strikes the under side of the rocker 106 and throws the ball 108 back onto the stationary shelf 109. The cam 124 is revolved by the handle 66 to release the locking latch formed by parts 114 and 122 and permit the slide lever 97 to move away from beneath the purchase keys thus setting the machine for further use.

If the receipt is 25 cents and the purchase 1 cent, the fifth key on the receipt element 77 (Fig. 9) is inoperative and since the 1 cent purchase key is also inoperative, then one gets back the full value of the 25 cent receipt key, which is 24 cents.

Figures 13, 14, 15, 16:
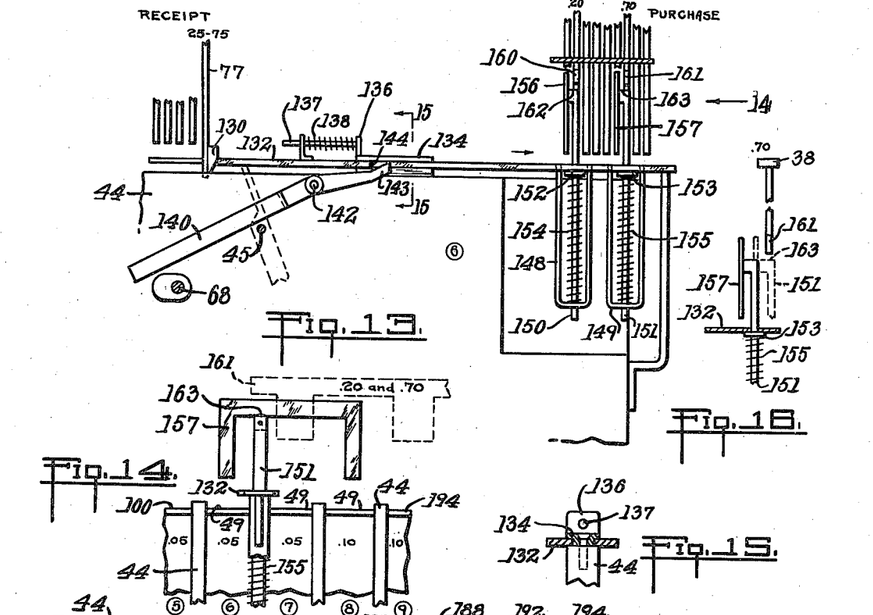
Fig. 13 is a fragmentary elevation on the line 13—13 of Fig. 10 showing the operating mechanism located above pockets Nos. 6 and 7 for controlling at times the mechanism in pockets Nos. 6 and 8.
Fig. 14 is a fragmentary elevation looking in the direction of the arrow in Fig. 13.
Fig. 15 is a sectional view on the line 15—15 of Fig. 13 showing the construction of the slide mechanism.
Fig. 16 is a side view of the end of the slide in another position.

A different type of construction is found in Figs. 13, 14, 15 and 16, which affects stations 6 and 8. As shown in Figs. 9, 10 and 13, the 25 and 75 cent receipt key 77 has a cam 130 located between stations 6 and 7 above the partition wall 44. This cam is V-shaped with its pointed end extended downwardly, and it is arranged to push against the forward end of a slide 132 mounted on the top of the partition wall 44 between stations 6 and 7. The slide has a slot 133 cut therein, and a short T-shaped member 134 fits within that slot and is secured to the wall 44 by a cap screw. This part 134 is so shaped relative to the slot as to form a slideway and permit the slide 132 to move back and forth properly. An upstanding lug 136 on the stationary T-shaped member 134 carries a laterally projecting rod 137 surrounded by a spring 138 and the other end of the spring engages an upright piece secured on the member 132 so that the pressure of this spring tends to hold the slide 132 in a forward position against the cam 130. A lever 140 pivoted at 142 on the adjacent cross walls 44 has its upper end 143 adapted to project into a slot 144 in the slide 132. The left hand of the lever is the heavier end and it serves to hold the end 143 against the under side of slide 134 and to swing the end 143 up into notch 144 in slide 132 when it is presented.

The rear end of the slide 132 has two U-shaped guides 148 and 149 depending from its under side. Each of these guides has a hole in its bottom and the slide 132 is provided with aligning holes through which rods 150 and 151 project. These rods have collars 152 and 153 secured thereon beneath the slide and springs 154 and 155 are provided to hold the rods in their uppermost positions. The upper ends of these rods project above the slide and carry T-shaped members 156 and 157 having their outer ends depending downwardly as shown particularly in Fig. 14 so that they form purchase key fingers adapted to contact respectively with the purchase rocker elements 16 in stations 6 and 8 under certain conditions. This contact, however, occurs only when the slide 132 has been pushed to the right by the cam 130 on the 25—75 cent receipt lever.

The 20 cent and the 70 cent elements have lips 160 and 161 at their right hand ends which extend over the partition between stations 6 and 7. When the 25—75 cent receipt key is pushed down, this moves the slide 132 towards the right, and the parts are so located that the shoulders 162 and 163 forming the upper ends of the rods 150 and 151 are moved beneath those lips 160 and 161. Then if either the 20 or 70 cent purchase key is depressed, the T-shaped arms on either of these upstanding elements will depress also the purchase rocker arms in stations 6 and 8. The construction of the rocker elements in these 6th and 8th stations is the same as described with reference to Fig. 1, and the construction of Fig. 13 merely serves to add the stations 6 and 8 at certain times to the set up. To make this more clear, consider an example in which the amount of money tendered is 25 cents and the purchase 20 cents. The set up will be as follows:

| Stations | 10 | 9 | 8 | 7 | 6 | 5 | 4 | 3 | 2 | 1 |
|---|---|---|---|---|---|---|---|---|---|---|
| Receipt key (.25) | – | – | 10 | 5 | 5 | – | 1 | 1 | 1 | 1 |
| Purchase key (.20) | 25 | 10 | – | 5 | – | – | – | – | – | – |
| Purchase key for zero | – | – | – | – | – | 5 | 1 | 1 | 1 | 1 |
| Set up in stations 6 and 8 | – | – | 10 | – | 5 | – | – | – | – | – |
| Change | – | – | – | – | – | 5 | – | – | – | – |

If it were not for the construction of Fig. 13, this would give a return of 15 cents instead of 5 cents, but the lip 160 on the 20 cent purchase key throws back into an inoperative position the rockers in stations 6 and 8 which were previously set up. Owing to the construction of Figs. 11 and 12, the 5 cent coin in the fifth station is added instead of being subtracted, and this is the only coin that is brought out by the money ejectors, it being remembered that station 5 is an addition station instead of one for subtraction. The same general condition works for the 70 cent purchase key, it being noted that whenever the purchase keys 20 and 70 cents are used it is necessary to use the 0 key. This applies to all multiples of 10.

Figure 17:
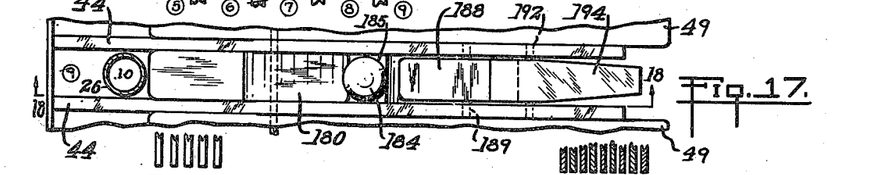
Fig. 17 is a fragmentary plan view of the elements in the No. 9 pocket.
Figure 18:
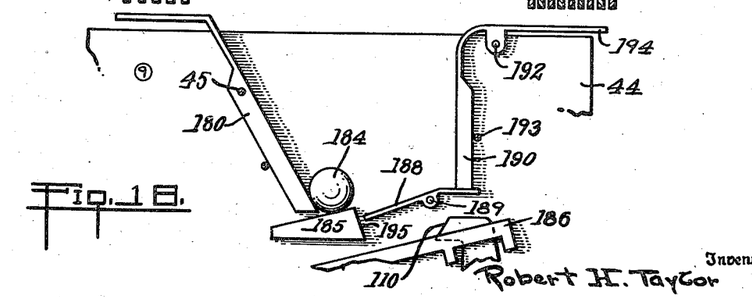
Fig. 18 is a sectional view on the line 18—18 of Fig. 16.

A still further arrangement is illustrated in Figs. 17 and 18, which is found in station 9 and is a modification of that found in station 5. That is, station 9 is an addition station. In this construction, the receipt rocker 180 is fashioned the same as rocker 12 in Fig. 1, and it is adapted to be operated by the receipt element keys in the usual fashion to throw the ball 184 off the shelf 185. The ejector 186 is similar in construction to the ejector 18 above described and is operated the same. The purchase rocker consists of a lever 188 pivoted at 189 and locked against rotation by the lower vertical arm of an L-shaped lever 190 which is pivoted at 192 on the framework and prevented from traveling rearwardly too far by the pin 193. The upper horizontal arm of this lever 194 is adapted to be struck by the purchase key elements in the usual manner. Hence, the operation of the 50 cents and the $1.00 receipt elements causes the fingers in station 9 to throw the ball 184 onto the end of the lever 188 where it is held in the V-shaped space between the lever and the sloping wall 195 of the block 185. If the purchase elements do not unlock the rocker 188, then no coins can be ejected in these stations. For example, if the receipt is 50 cents and the purchase 20 cents the set up will be as follows:

| Station | 10 | 9 | 8 | 7 | 6 | 5 | 4 | 3 | 2 | 1 |
|---|---|---|---|---|---|---|---|---|---|---|
| Receipt key (.50) | 25 | – | 10 | 5 | 5 | – | 1 | 1 | 1 | 1 |
| Purchase key (.20) | 25 | 10 | – | 5 | – | – | – | – | – | – |
| Purchase key zero | – | – | – | – | – | 5 | 1 | 1 | 1 | 1 |
| Change | – | 10 | 10 | – | 5 | 5 | – | – | – | – |

In this case the receipt key for 50 cents is unable to complete the set up of station 9 because of its being locked, but the purchase key for 20 cents has a finger in the ninth position and this, therefore, completes the set up and adds the 10 cent coin for ejection. Similarly, the 5 cent coin in station No. 5 is added so that the change tendered consists of two dimes and two nickels. It is due to these special constructions which in certain cases add coins and in others subtract coins from the values set up by the receipt keys which makes the mechanism so simple in its design and thus minimizes the number of stations or coin compartments that are needed for giving any change required from the receipt of $1.00. The cam 110 (Fig. 11) returns the ball.

Referring to Fig. 6, I have there shown a drawer 200 adapted to hold bills or surplus coins. This drawer is suitably mounted in the bottom of the casing and adapted to be pushed outwardly by a spring 202 which engages the back of the drawer and is suitably carried on a mount 204. This drawer may be locked in a closed position by a latch 205 pivotally mounted at 206 on a portion of the framework of the casing. The lower end of the latch has an overhanging lip 207 adapted to interlock with a lug 208 fastened on the side of the drawer. In order to unlock this device automatically, the rear end 209 of this lever rests against the short end of a lever 210 pivotally mounted at 211 on the casing. The long end of this lever 210 is sufficiently heavy to hold it against a stop 212 when the machine is not in use. When the bar 64 is moved forward to operate the money ejector, it strikes the upstanding short left hand end of the lever 210 and thrusts it down against the right hand end of the lever latch 205 and thus lifts the latter from contact with the locking lug 208 and permits the spring 202 to eject the drawer to a desired position such as where the stop 212 strikes a further projection on the casing. The drawer is closed by hand when the pusher 64 has been moved back to its initial position.

It will now be appreciated, in view of the above disclosure, that various modifications may be made in the construction of this device and that the above description is to be considered as an example and not a limitation on my invention. Hence, the claims are to be interpreted broadly as covering such equivalent constructions. For example, the weights may be moved into contact with the ejectors instead of the purchase rockers to move the ejectors directly to their operative positions, and the purchase key rockers will be employed to return the weights to their stationary supports. Also, the stationary shelves for the weights may be omitted and the weights carried directly by the rockers. Numerous other changes in the construction of the rocker and ejector mechanism may be made within the scope of the claims. Likewise, the arrangements of the keys and their finger elements may be varied. If desired, the special constructions of stations 5 and 9 may either one or both be omitted, with a corresponding addition of mechanism of the type shown in Fig. 1 to replace the same. However, the above described construction gives the material advantage of minimizing the number of stations and keys that need to be operated. It will of course be understood that the device may be operated by power mechanism, such as an electric motor, arranged to move the ejectors or the money drawer, when the register keys are manipulated. The device may be materially simplified for use with smaller sums of money than one dollar and to make change which does not require pennies. For use with foreign currency, the keys and their elements will, of course, be modified to suit those monetary needs. Numerous other changes will now be readily apparent to one skilled in this art.

I claim:

1. A change making machine comprising coin receptacles, a slidably and tiltably mounted ejector for each receptacle, receipt and purchase keys, a shelf and a movable weight normally positioned thereon associated with each ejector, a set of tiltable purchase key rockers located near the shelves and said ejectors and arranged to receive and be tilted by the associated weights and in turn to tilt the associated ejectors, a set of receipt key rockers movable by the receipt keys and arranged to thrust selected weights off their shelves to tilt the purchase key rockers, arms on the purchase key rockers arranged to be struck by the purchase keys for thrusting selected weights back onto their shelves and thus rendering selective ejectors inoperative, a pusher device to move the ejectors and eject coins from the receptacles and means operated by the pusher device for returning the displaced weights to their shelves.

2. A change making machine comprising coin receptacles, pivotally and slidably mounted ejectors for removing coins therefrom, a weight and a stationary shelf supporting the same which are associated with each ejector, a set of purchase key rockers, each being pivotally mounted to tilt the associated ejector into an operative position or to thrust the weight back onto its shelf, a set of receipt key rockers, each being pivotally mounted for moving the associated weight from its shelf and causing it to move the purchase key rocker and tilt the corresponding ejector, receipt keys and finger elements for operating the receipt key rockers, purchase keys and finger elements for moving the purchase key rockers and thrusting the associated weights onto their shelves and pusher means rendered operative by tilting an ejector to an operative position for sliding the same to eject a coin.

3. A change making machine comprising a coin receptacle, tiltable ejector movable from an inoperative to an operative position for subsequently removing a coin therefrom, a weight, a support therefor, a purchase key rocker arranged to be tilted by the weight and to move the ejector to an operative position or to return the weight to said support, a receipt key and means associated therewith for moving the weight from the support onto the rocker, a locking device preventing movement of the rocker, a purchase key and mechanism operated thereby for releasing the locking device and permitting the weight to tilt the ejector to an operative position and means for moving the ejector to eject the coin and for returning the weight to its support.

4. A change making machine comprising coin receptacles, ejectors movable from inoperative to operative set up positions for subsequent relative movement for ejecting a coin from each of said receptacles, a weight associated with each ejector and movable to set up the same under the influence of gravity, manually operable receipt and purchase keys, means associated with the receipt keys which serves to move the weights and cause selected ejectors to be set up into operative association with the coin receptacles, means operated by selected purchase keys for rendering a weight and an associated set up ejector ineffective, and means for relatively moving the remaining set up ejectors and associated coin receptacle to eject the required coins.

5. A change making machine comprising coin receptacles, a set of elements normally biased into inoperative positions which are movable to operative set up positions where they may subsequently cause coins to be ejected from said receptacles, manually operable receipt keys and purchase keys, a set of weights movable to operative positions where, under the influence of gravity, they may set up said elements, mechanism movable by the receipt keys to move the weights into operative positions for setting up their associated elements, mechanism operable by the purchase keys which renders selected set up elements inoperative and means whereby the remaining set up elements may be moved to cause coins to be ejected from the receptacles.

6. A change making machine comprising coin receptacles, a tiltable and slidable ejector associated with each receptacle for removing a coin therefrom, a set of movable weights, each of which is movable to a position where it is moved by gravity to set up and render an associated ejector operative, receipt keys and elements operated thereby which are arranged to move the weights and render selected ejectors operative, purchase keys and associated elements operated thereby which are arranged to remove from operative relationship selected weights and the corresponding set up ejectors and means for moving the operative ejectors to eject said coins.

7. A change making machine comprising coin receptacles, normally inoperative, tiltable ejectors movable into operative relation with the coin receptacles for subsequently ejecting coins therefrom, a set of weights, manually operable receipt and purchase keys, overbalanced rockers arranged to be tilted by associated weights under the influence of gravity and to engage and tilt and thereby set up selected ejectors, elements operated by the receipt keys to move selected weights onto the associated rockers and set up selected ejectors, said rockers being so constructed and arranged that they are movable by the purchase keys to remove the selected weights from their associated rockers and render the associated set up ejectors inoperative, and means for relatively moving the remaining set up ejectors and the coin receptacles to eject the required coins.

8. A change making machine comprising a set of coin receptacles, a coin ejector for each receptacle which is tiltable to operative and inoperative positions, a set of five receipt keys for setting up ejectors in multiples of 5 cents up to one dollar and two sets of purchase keys, eighteen in all, corresponding respectively with the units 1–9 and multiples of 10 below one dollar, a set of weights, each of which is movable to tilt an associated inoperative ejector under the influence of gravity and render the same operative, mechanism operated by the receipt keys which moves the weights to set up selected ejectors and render them operative, means actuated by operation of one of each set of purchase keys to remove the influence of the shifted weights from selected set up ejectors and render them inoperative and means for moving the remaining set up ejectors to eject the coins.

9. A change making machine comprising a coin receptacle, an ejector element movable from an inoperative to an operative set up position where it may subsequently eject a coin from said receptacle, a movable weight, a receipt key, a purchase key, means operated by the receipt key for moving the weight to a position where it may subsequently set up said element under the influence of gravity, a locking device which normally prevents said weight from setting up said element, mechanism operated by the purchase key which releases said locking device and permits the weight to move and set up said element, and means for moving the ejector element to cause a coin to be ejected from said receptacle.

10. A device of the type covered by claim 3 wherein the locking device and its releasing mechanism comprise a locking member removably located in the path of the rocker for preventing movement thereof, a purchase key finger element having a surface remote from said member, a key movable into contact with said surface and member whereby operation of the purchase key releases the locking member, and means operated by a receipt key for moving the key into said contacting relationship.

11. A change making machine comprising a coin receptacle, an ejector element normally biased by gravity into an inoperative position and movable to an operative set up position where it may subsequently eject a coin from said receptacle, a weight, a support normally holding the same, a receipt key, a purchase key, mechanism operated by the receipt key for moving the weight from the support to a position where it may subsequently move the ejector element to a set up position, a locking device which normally prevents the weight from setting up said ejector element, means rendered effective by said receipt key and operated by the purchase key for releasing the locking device and permitting the moved weight to set up said element, means for moving the ejector element to cause a coin to be ejected from the receptacle, and means for returning the locking device for a locking condition upon release of the purchase key.

ROBERT H. TAYLOR.